United States Patent  [15] 3,676,918
Fischer  [45] July 18, 1972

[54] METHOD OF MAKING STRUCTURAL ELEMENT

[72] Inventor: Artur Fischer, Altheimer Str. 219, D-7241 Tumlingen, Germany

[22] Filed: Jan. 28, 1970

[21] Appl. No.: 6,500

[30] Foreign Application Priority Data

Feb. 3, 1969 Germany .................... P 19 05 219.8

[52] U.S. Cl. .................................. 29/453, 46/25, 156/245
[51] Int. Cl. ............................................. B23p 11/02
[58] Field of Search .................. 46/16, 17, 30, 31, 25, 26; 29/453, 418, 428, 463, 416; 156/245

[56] References Cited

UNITED STATES PATENTS

| | | | |
|---|---|---|---|
| 1,286,462 | 12/1918 | Wesche | 46/26 |
| 2,119,921 | 7/1938 | Levy | 46/25 |
| 2,972,833 | 2/1961 | La Grutta | 46/30 X |
| 3,184,882 | 5/1965 | Vega | 46/25 |
| 3,254,440 | 6/1966 | Duggar | 46/25 |
| 3,405,479 | 10/1968 | Paulson | 46/26 X |
| 3,496,670 | 2/1970 | Sloop et al. | 46/26 X |

FOREIGN PATENTS OR APPLICATIONS 1,049,484  11/1966   Great Britain ............................ 46/25

Primary Examiner—Charlie T. Moon
Attorney—Michael S. Striker

[57] ABSTRACT

A hollow structural element and a method of making the same are disclosed. The structural element is bounded by outer peripheral walls at least some of which are provided with coupling elements. It consists of a plurality of discrete sections which together have the configuration of the completed hollow structural element, and which are assembled and connected with one another, releasably or non-releasably, so as together have the configuration of the structural element.

1 Claim, 3 Drawing Figures

Inventor:
ARTUR FISCHER 3,676,918

METHOD OF MAKING STRUCTURAL ELEMENT

BACKGROUND OF THE INVENTION

The present invention relates generally to structural elements, and more particularly to hollow structural elements and to a method of making the same.

It is known to use structural elements, particularly hollow structural elements, which are provided on their side faces and/or their end faces with connecting means such as coupling projections, coupling grooves or the like, particularly of uncut configuration, so that they can be coupled with other structural elements. Elements of this type are used in toy building kits for connecting components of the building kit with one another, they are used in pieces of furniture for connecting sections of the furniture piece to one another, and for other applications.

Conventionally such structural elements—which frequently consist of plastic synthetic material—are made by continuous extrusion so that an elongated rod is produced having the outer profile desired for the structural element, whereupon lengths are severed from this rod which correspond to the length of the individual structural elements desired to be obtained. The problem with this approach to manufacturing the structural elements is that the limits of tolerance variations and shape accuracy attainable by extruding the elements in this manner are frequently not satisfactory for the requirements of a particular application. For instance, the tolerance variations of the connecting means provided on the structural elements must be maintained within relatively narrow limits in order to obtain a durable and tight connection with other elements when the structural element is connected to the same. This is true regardless of what the circumstances of use of the structural element are, that is whether it is used for instance in assembling components of a piece of furniture, or in a toy erecting kit. In fact, in a toy erecting kit this is particularly important because only in this manner is it possible to erect models—in which the individual components are connected by such connecting means—which are capable of withstanding the sometimes vigorous play activities of a child.

A further approach to making such hollow structural elements is to injection mold them. However, by contrast to the length obtainable with the first-mentioned approach, the lengths attainable by injection molding is necessarily limited by the size of the mold. A further consideration here is that because of the frequently provided grooves on said structural elements the separation of the mold extends at right angles to the elongation of the hollow structural element in the region of one end face thereof. To make it possible to readily remove the structural element from the mold it is necessary to make the structural element slightly conical in its direction of elongation because this provides for a more ready separation from the mold. Such conicity may be very small, but if the hollow structural element is relatively long it does amount to such a value that the dimensional accuracies mentioned above can no longer be attained. Therefore the length of such structural elements which are made in an injection molding process is necessarily limited by this consideration. This is readily understandable if one considers that for instance a coupling projection introduced into a groove provided on an injection molded hollow structural element of considerable length would be very difficult to slide along the groove at one end of the element but would be very loose in the groove at the other end of the element, that is at the end which tapers because of the aforementioned conicity.

SUMMARY OF THE INVENTION

It is, accordingly, an object of the present invention to provide an improved method of making hollow structural elements of the type under discussion.

A more particular object of the invention is to provide such a method which is not possessed of the aforementioned disadvantages.

An additional object of the invention is to provide such a method which permits the making of such hollow structural elements of relatively great length but with high dimensional accuracy which remains uniform throughout the entire length of the element.

A concomitant object of the invention is to provide such a method which is to be time-saving and simple.

Still a further object of the invention is to provide an improved hollow structural element made in accordance with the method according to the present invention.

In pursuance of the above objects, and others which will become apparent hereafter, one feature of my invention resides, briefly stated, in a method of making a hollow structural element bounded by outer peripheral walls at least some of which are provided with coupling elements. This method comprises the steps of making a plurality of discrete sections which together have the configuration of the desired hollow structural element, assembling these sections so that together they have the configuration of the hollow structural element, and connecting such sections with one another.

Generally speaking, the individual sections can be readily produced by injection molding in a simple two-part mold. This is a simple procedure and is quick as well as relatively inexpensive. In one and the same operation the sections can be molded together with the connecting means such as grooves or coupling projections. For facilitating removal of the finished sections, the injection mold may be parted or separated in a plane parallel to the elongation of the sections so that the previously mentioned conicity no longer disadvantageously influences the dimensional accuracy of the section, or does so only to a negligible extent.

The individual sections can be connected, either separably or non-releasably. This can for instance be accomplished by heat welding, by the use of bonding materials or by snap connections. Evidently, heat welding or bonding provides for permanent non-releasable connections which preferably are carried out during the manufacturing process. On the other hand, snap connections or similar connections are releasable and make it possible to supply the sections in non-assembled condition so that the user himself can assemble them to form an element of whatever cross-sectional configuration he requires, in dependence upon prevailing circumstances. Thus it is for instance possible to combine different basic discrete sections to obtain a structural element of L-shaped, U-shaped, triangularly shaped, quadradically shaped, or other cross-sectional configuration. It is also possible to connect discrete sections in such a manner as to obtain a hollow structural element which is provided on all of its outer surfaces with only grooves, with only coupling projections or other connecting means which may have been provided on the respective sections. Again, it is possible to so select and combine different ones of the discrete sections that one or more of the outer surfaces of the structural element remain free from coupling means or connecting means, a possibility which is particularly advantageous when such structural elements are used for assembling components of a piece of furniture because a smooth surface is then frequently desired. Also, it is possible in this case to utilize the discrete sections separately without assembling them and thereby still further increase the possibility of different configurations attainable.

It is advantageous that all or at least some of the sections are angular profiles composed of two arms each of which corresponds to approximately the size and configuration of half of a side wall of the completed structural element, and the free longitudinal edges of which are spaced from the free longitudinal edges of an adjacent section—when the sections are assembled to form a hollow structural element—to define between them a slot or groove constituting a coupling means. If for instance the structural element is to be of quadratic cross section, it is necessary to provide four of these angular profiles which can readily be produced by injection molding in a simple mold. They can be connected by webs, intermediate partition walls or the like. However, they can also be provided at their free longitudinal edges with some projections which contact the corresponding longitudinal edges of the adjacent sections and are connected therewith.

According to a further embodiment of the invention, at least one of the sections may be an angular profile consisting of two parts each of which corresponds in size and outline to a side wall of the completed hollow structural element, with one or both of the parts being provided with slots or grooves for coupling purposes. In this case only two of these sections would be required for instance to obtain a hollow structural element of quadratic cross section, and their free edges can be connected by bonding, welding or analogous means.

The grooves may be throughgoing, that is they may go through the entire thickness of the respective part and may also extend over the entire length thereof. In this case they of course subdivide such part into two portions separated by a groove, or rather a slot as it would then be more properly called. These portions can be connected by ribs, webs, intermediate walls and/or end walls which may be formed at the same time as the sections themselves are formed. The side walls bounding such slots may be inclined with reference to one another and, because the slots extend all the way through the thickness of the respective portion of the section in which they are provided, they can in effect be used as undercut grooves with the wider portion of the groove being constituted by the hollow interior of the structural element assembled from such sections.

Of course, the sections may also be molded in a flat configuration, where all parts are located in a common plane as they are molded. In this case the individual portions of each section are moved to their desired positions relative to one another after the section is removed from the mold, and are fixed in these positions. This is particularly advantageous because of the simplicity of the mold required. To construct a hollow structural element with such sections it is simply necessary to displace one part of each two-part section so that it extends in a plane which is normal to the plane of the other part, to do the same with the parts of a second discrete section, and then to connect these sections with one another along their free edges. This results in a stiff and deformation-resistant hollow structural element. The connecting means can of course be readily formed integral with the respective sections.

To facilitate the displacement of one part of such a section with reference to the other part, the parts can be connected by a thin elastically yieldable web, which is already known as a so-called "integral hinge." This is a web of the same material as the two parts which is integral with both, and it facilitates greatly the displacement of the two parts to their desired relatively positions.

According to a further embodiment of the invention one of the sections may also be formed integrally at one end with an end wall, and another section—for instance the second section if there are only two required for assembling the hollow structural element—may be formed at the opposite end with a second end wall so that, when the two sections are assembled and connected, the completely enclosed hollow structural element is readily obtained. Instead of or in addition to coupling means provided on the side walls of the hollow structural element, one of the end walls may also be provided with a coupling groove and the other of the end walls with a coupling projection.

The individual sections may also be connected and/or stiffened by provision of ribs, end walls, intermediate walls, projections or the like located internally of the completed hollow structural element.

The coupling grooves and/or coupling projections may be undercut to provide for more durable and tighter connections of the individual hollow structural elements with another, or with other structural elements if they are to be connected without requiring special expensive tools for producing the undercut grooves which, it will be understood, can be readily formed during the injecting molding process. It has been found advantageous in this case to provide whatever ribs, projections, end or intermediate walls which are used for reinforcing and stiffening purposes, with cutouts particularly of circular form in the region of these grooves. These cutouts permit the insertion of shafts, pins or the like, a consideration which is particularly advantageous and important if the hollow structural element is used in conjunction with a toy erecting kit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
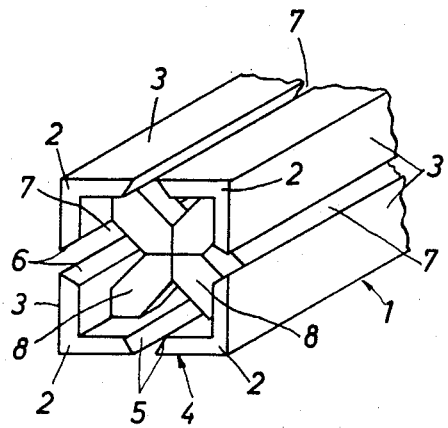
FIG. 1 is a perspective view illustrating a hollow structural element composed of four angular sections.

Discussing firstly the embodiment illustrated in FIG. 1 it will be seen that reference numeral 1 generally identifies a hollow structural element. It is composed of four angular sections 2 the arms of each section 2 being identical. The arms are identified with reference numeral 3 and each corresponds in size and outline to approximately half of a side wall 4 of the element 1.

The adjacent free longitudinal edges 5 and 6 of any two neighboring sections 2 extend with spacing from one another and define between each other and on each side wall a groove or slot extending lengthwise of the structural element 1. Ribs 8 which are formed of one piece with the angular sections 2, connect the sections with one another. Of course, the ribs are formed of one piece with only one of the sections 2—although different ribs may be of one piece with different sections 2— and are secured to the other sections 2 by welding, bonding or in other manner.

Figure 2:
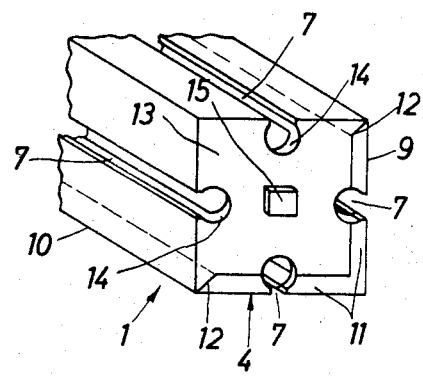
FIG. 2 is a view similar to FIG. 1 but illustrating a hollow structural element composed of only two angular sections.

The structural element illustrated in FIG. 2 is also composed of two angular sections 9 and 10 whose arms 11 are identical. Here, each arm 11 has the outline and size of an entire side wall 4 of the element. In the region of two diagonally opposite longitudinally edges 12 the sections 9 and 10 are connected by bonding or in another manner. Each of the arms 11 is provided with an undercut groove 7 extending lengthwise of the element and one end of the element is closed by an end wall 13 which is of one piece with one of the sections (here the section 10) and provided with circular cutouts 14 which are aligned with the grooves 7. The other section (here the section 9) is provided at the opposite end of the element with a similar end wall which is not visible in the drawing. These end walls serve to also connect the parts into which the arms 11 are subdivided by the presence of the grooves 7. There is further provided on the end wall 13 an undercut projecting coupling portion 15.

Figure 3:
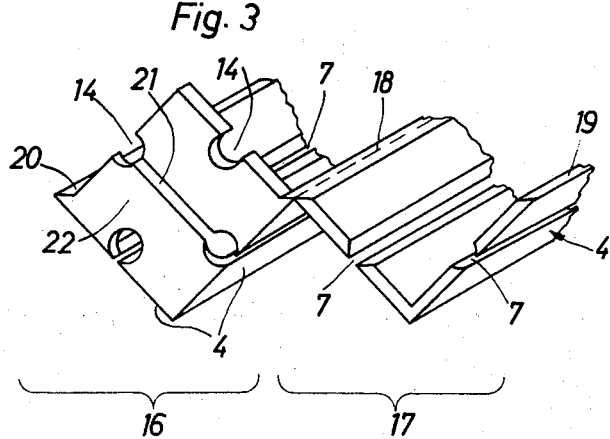
FIG. 3 shows a hollow structural element in open condition.

Coming, finally, to the embodiment illustrated in FIG. 3 it will be seen that this shows pairs of side walls 16 and 17 each composed of two adjacent side walls 4. FIG. 3 shows the construction immediately after removal from the mold wherein it has been produced by injection molding. In the region of their common longitudinal edge 18 the pairs 16 and 17 are connected by a thin web (not shown) which constitutes an integral hinge, being integral with both the side wall pair 16 and the side wall pair 17 and making it possible to move one pair with reference to the other—for instance the pair 17 to its left in FIG. 3—until the longitudinal edges 19 and 20 of the respective pairs 16, 17 contact one another so that they can be connected by bonding, welding, snap couplings or the like. At one end the side wall pair 16 is provided with an end wall 22 provided with a coupling groove 21 which is formed with circular cutouts 14 communicating with the grooves 7 so that these cutouts, shafts or the like can be inserted into the grooves. The end wall 22 can also be made of one piece with the side wall pair. In this case the cutouts 14 can be produced in a most simple manner by inserting plugs or cores whose presence results during injection molding in the formation of the cutouts 14.

A similar end wall (not illustrated) can be provided on the side wall pair 17 at the opposite end from the end wall 22 and may be provided with a coupling projection in place of the groove 21.

It will be understood that each of the elements described above, or two or more together, may also find a useful application in other types of constructions differing from the types described above.

While the invention has been illustrated and described as embodied in a hollow structural element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of making a composite hollow structural element of at least substantially quadratic cross-section and having an annular circumferential wall which is composed of a pair of circumferentially successive wall sections at least some of which are provided with coupling elements, comprising the steps of forming by injection-molding a one-piece blank resembling in configuration a development of said annular circumferential wall and including said wall sections each of which comprises two portions located in mutually inclined planes and respectively corresponding to adjacent side walls of said structural element, one portion of each section being connected with one portion of the other section along adjacent edges by a thin web, and the other portion of each section having respective free edges extending in at least substantial parallelism with said adjacent edges; thereupon displacing said sections relative to one another by folding them at said web until said free edges abut; and connecting said other portions with one another in the region of said free edges.

* * * * *